United States Patent [19]

Schubert

[11] Patent Number: 4,815,748
[45] Date of Patent: Mar. 28, 1989

[54] SHAFT SEAL FOR GAS-FILLED MACHINES

[75] Inventor: Johann Schubert, Windisch, Switzerland

[73] Assignee: BBC Brown Boveri AG, Baden, Switzerland

[21] Appl. No.: 172,272

[22] Filed: Mar. 23, 1988

[30] Foreign Application Priority Data

Mar. 23, 1987 [CH] Switzerland ................ 01100/87

[51] Int. Cl.$^4$ .................. F16J 15/40; F16J 15/48
[52] U.S. Cl. .......................... 277/3; 277/15; 277/27
[58] Field of Search .............. 277/3, 15, 17–21, 277/27

[56] References Cited

U.S. PATENT DOCUMENTS

| 3,119,623 | 1/1964 | Schevchenko | 277/3 |
| 4,486,024 | 12/1984 | Cooper | 277/27 X |
| 4,502,693 | 3/1985 | Lesiecki et al. | 277/3 |
| 4,534,569 | 8/1985 | Ishitani et al. | 277/27 |
| 4,579,349 | 4/1986 | Pipich | 277/3 |

FOREIGN PATENT DOCUMENTS 385581 3/1965 Switzerland .
865605 4/1961 United Kingdom ............. 277/3

OTHER PUBLICATIONS

BBC, Brown Boveri, Publication No. CH-T 070 022E, 3 pages, supplied by applicant, no date given.

Primary Examiner—Robert S. Ward
Attorney, Agent, or Firm—Oblon, Fisher, Spivak, McClelland & Maier

[57] ABSTRACT

In a shaft seal for hydrogen-cooled, turbo-generators, the operating requirements for a minimum gas-side leakage flow without secondary liquid circuit and cooling of the entire axial ring length are fulfilled either with choke elements (8) or with an inner transfer of sealing liquid from the gas side (G) to the air side (L) so that this shaft seal can function with a single sealing liquid circuit as a so-called single-circuit seal in parameter areas which are at present still the preserve of a multi-circuit seal.

9 Claims, 4 Drawing Sheets

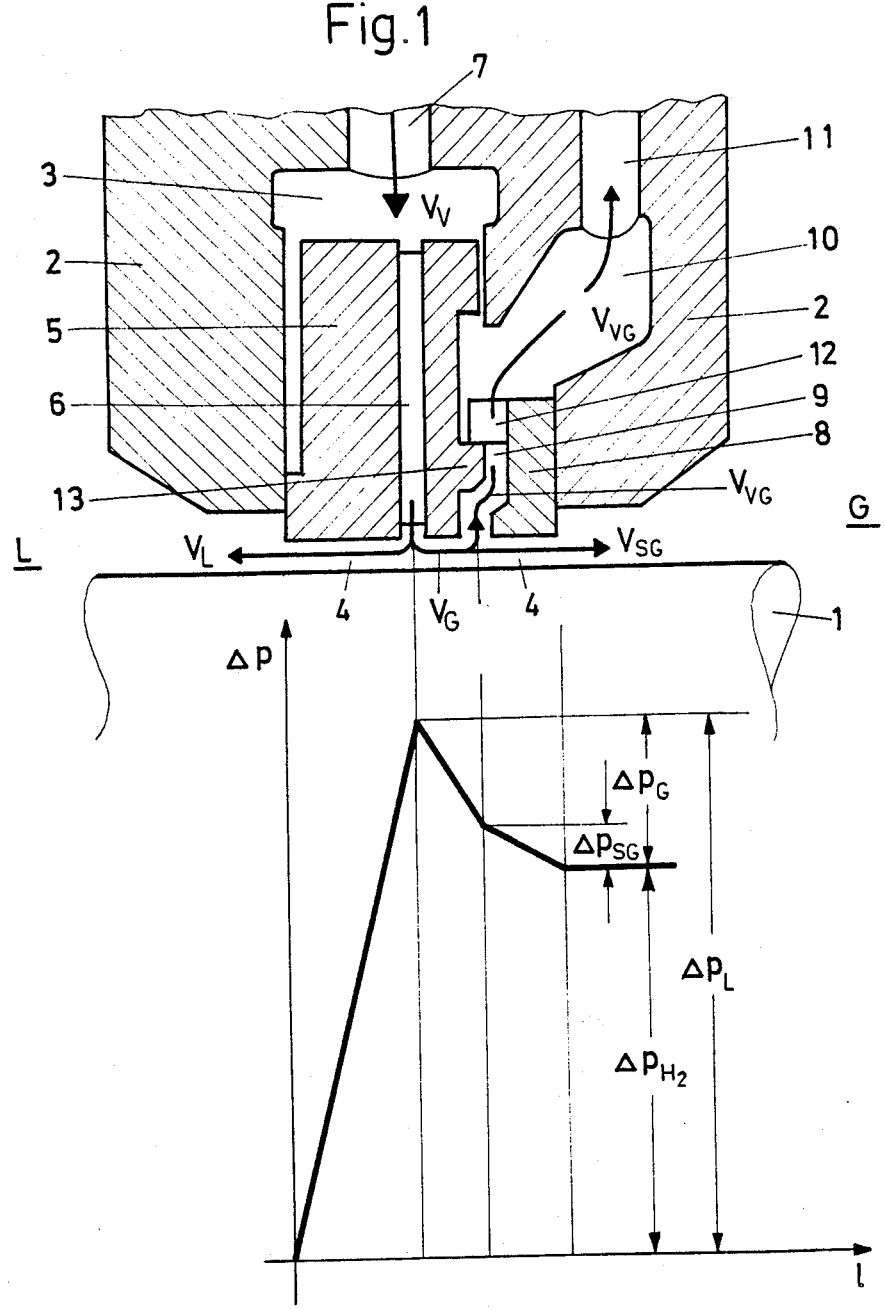

Fig. 5
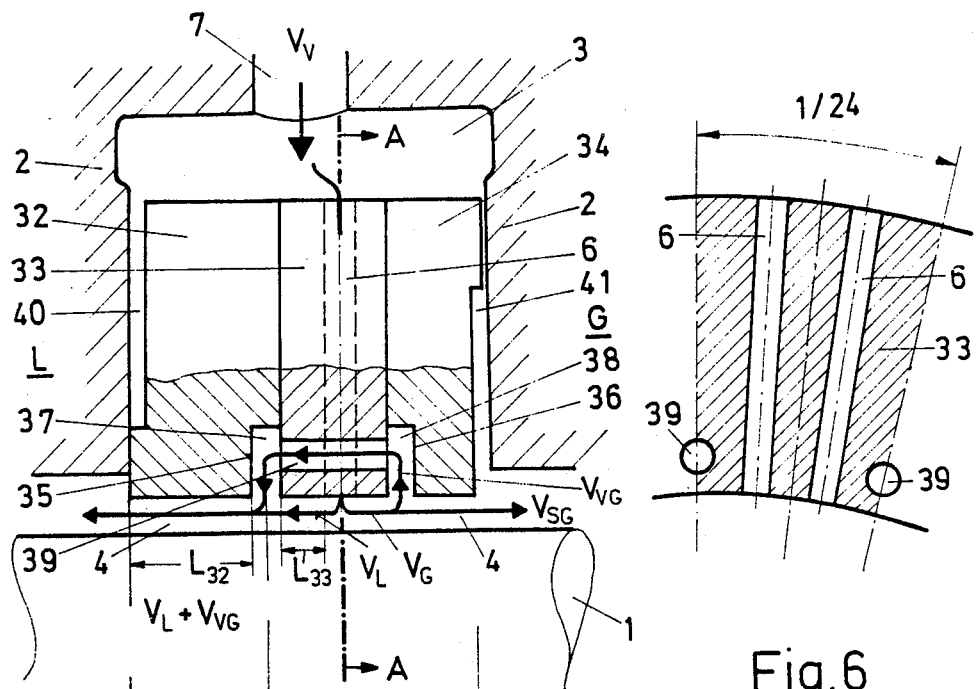
Fig. 6
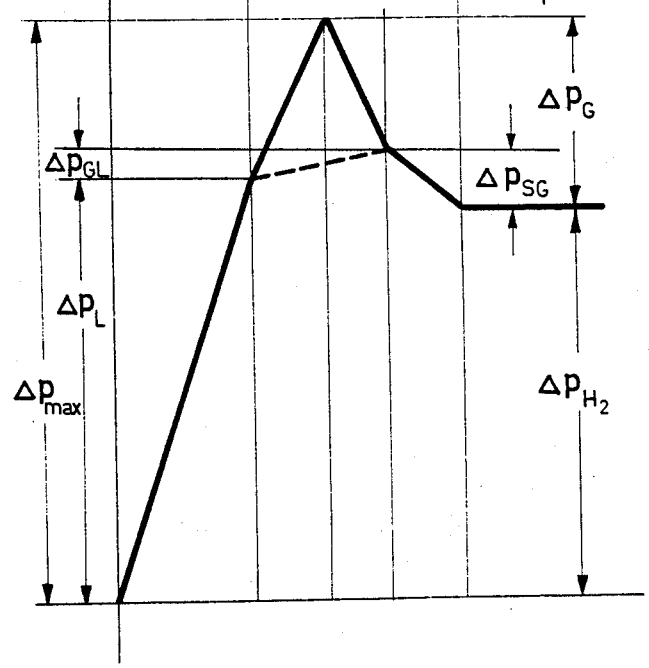
Fig. 7

SHAFT SEAL FOR GAS-FILLED MACHINES

DESCRIPTION

FIELD OF THE INVENTION

The invention relates to a shaft seal for gas-filled machines, in particular hydrogen-cooled turbogenerators, comprising a pressure ring chamber to which degassed confining liquid is fed under positive pressure via a feed line, a sealing ring which surrounds the shaft while maintaining a sealing gap, has bores or channels which run approximately radially and open out in the sealing gap and is arranged in the pressure ring chamber in a substantially radially movable manner, and means for drawing off the confining liquid which comes laterally out of the sealing gap and for reconducting it to a confining-liquid preparation and pressure-generating plant.

A shaft seal having these features has been disclosed, for example, by Swiss Patent Specification No. 385,581.

TECHNOLOGICAL BACKGROUND AND PRIOR ART

In large, high-speed electrical machines filled with hydrogen and in centrifugal compressors for dangerous gases, the shafts are sealed relative to the housing at the shaft housing passages with confining liquid, the sealing or confining liquid being kept in circulation. The liquid, preferably oil, fed to the seal under pressure produces in an annular gap a blocking action against an outflow of the gas from the machine. As a result of the solubility of the gas, the confining liquid absorbs air and passes the latter to the gas filling inside the machine, as a result of which the desired (or required) purity of the gas is (impermissibly) reduced. In order to prevent this, the confining liquid is therefore degassed under vacuum, which requires relatively large degassing appliances especially in the case of high gas pressures and/or large shaft diameters. Accordingly, in such plants, the gas losses and the tendency to foam are considerable. The gas losses are proportional to the volumetric flow of the confining liquid flowing off to the gas side and to the gas pressure.

In shafts having high peripheral speeds, i.e. having high speeds relative to the static sealing ring secured in the housing, in order to meet the demands of a satisfactory function in all operating states, the seals have to be made as so-called floating ring seals. Floating ring seals are understood, inter alia, as such liquid seals in which the liquid flowing off axially to both sides from the sealing location not only assumes the sealing function but at the same time also acts as a carrier for the frictional heat to be dissipated. This ensures, inter alia, that the sealing ring is not excessively deformed thermally, does not jam in the housing and does not graze on the shaft. It is known that accomplishing a sufficient heat dissipation by the liquid requires a sufficiently large radial operating clearance, as a result of which the (axial) leakage volumetric flow (in particular in the case of large shaft diameters) flowing in the direction of the machine interior also becomes very large and therefore the above operating requirement essentially cannot be fulfilled.

The leakage flow flowing off axially to the gas side from the sealing location has to be discharged from the machine again. However, a quantity of gas corresponding to the solubility also has to be constantly transported along with this leakage flow, which quantity of gas has to be removed from the liquid by suitable appliances (evacuating appliance) to prevent explosions or dangerous contamination of the atmosphere.

This quantity of gas which is removed entails, in particular in hydrogen-cooled turbo-generators, a flow loss which has to be replaced from an $H_2$ reservoir and therefore is limited (cf. for example, DIN VDE 0530/Part 3).

Since hydrogen can escape not only at the shaft seal (controllable) but also at other uncontrollable sealing locations of the generator, the controllable loss at the shaft seal must be kept to a minimum.

Measures which keep this loss within permissible limits have hitherto remained restricted only to active elements (pumps) which circulate a liquid in a closed circuit in such a way that at the sealing location across a certain sealing gap the pressure gradient is on average zero per unit time. Such closed (secondary) liquid circuits which act as a gas-loss barrier, are used in special two-circuit shaft seals and in three-circuit shaft seals.

The closed secondary liquid circuit, apart from the circulation pump, requires for the satisfactory function of the seal the further components:
recooling appliance
temperature control
heating
pressure regulating device
filter for separating dirt particles The pressure regulating device is required to ensure the same pressure between the secondary liquid circuit and the primary sealing liquid circuit.

For reasons of economy, the components of the secondary liquid circuit are constructed with no built-in redundancy. Therefore provision has to be made for the quantity of liquid which, in the event that the secondary circuit circulation pump fails, flows steadily from the primary circuit (main liquid circuit) toward the secondary circuit to be drawn off again, which requires an additional control line and an additional control regulator.

The most important disadvantage of the present solution is that, as a consequence of the fact that the pressure gradient in the sealing gap R is zero by design no convection cooling of the ring can take place in this area. The result is ring deformation (inversion) which is caused by thermal stress and leads to jamming of the ring in the housing when axial clearance is too small. Large axial clearance is undesirable on account of the oil leakage at the end face. However, jammed rings have lost the function of floating rings and over prolonged operating periods can cause damage to the material at ring and shaft as a result of unavoidable mixed friction effects.

BRIEF DESCRIPTION OF THE INVENTION AND ITS ADVANTAGES

Based on the prior art, the object of the invention is to create a shaft seal for gas-filled machines which is distinguished by simplicity of construction and a maximum of reliability and does not need a secondary or even a tertiary circuit, but which at the same time is up to the standard of multi-circuit systems with regard to sealing action, gas purity and gas losses.

To achieve this object, the invention provides two alternatives which are based on a common inventive idea, namely avoiding sealing gaps between shaft and sealing ring (parts) through which no liquid flows and thus eliminating all consequences of sealing ring deformations.

In the first alternative, the operating requirement of minimum gas-side leakage flow and complete flow through the sealing gap in the above sense is achieved according to the invention when, in the pressure ring chamber, next to the sealing ring, a second, substantially axially movable ring is provided which is arranged between the sealing ring and the gas-side end wall of the pressure ring chamber, and when, in the second ring or between the first and second ring, substantially radially running channels are provided through which a portion of the confining liquid flowing off to the gas side is drawn off from the sealing gap.

The second ring acts as a choke element and deflects a portion of the liquid flow flowing off to the gas side; this liquid flow thus does not come into contact with the filling gas in the machine and thus also cannot absorb any filling gas.

In the second alternative, the operating requirements for minimum gas-side leakage flow and the complete flow through the sealing gap is achieved according to the invention when means for transferring a portion of the confining liquid, flowing off to the gas side of the shaft seal, to the air side of the shaft seal are provided in the sealing-ring center part or in the seal housing.

In a first embodiment, provision is made according to the invention for encircling annular grooves to be provided in the sealing-ring center part on both sides of the radial bores, and for approximately radially running bores to be provided in the sealing-ring center part in the area close to the gap, which bores open out into the said annular grooves and do not intersect said radial bores.

The axially running bores in the sealing-ring center part act as overflow channels and draw off a predeterminable portion of confining liquid from the gas side to the air side so that here, too, this component flow does not come into contact with the filling gas in the machine and thus also cannot absorb any filling gas.

In a second embodiment, the transfer from the gas side to the air side of the shaft seal takes place virtually completely in the sealing housing. For this purpose, the sealing ring is subdivided into a gas-side and an air-side sealing ring. An encircling groove open toward the sealing gap is made in the gas-side sealing ring, which groove, via a plurality of axially running bores, is in each case connected to a substantially U-shaped overflow line which runs completely in the seal housing and does not intersect the feed line in the seal housing, which overflow lines open out on the air side in the gap between shaft and seal housing.

The groove in the sealing ring and the adjoining lines in the seal housing act in a similar manner to the axially running bores in the sealing ring of the first embodiment and draw off a predeterminable portion of confining liquid from the gas side to the air side so that here, too, this component flow does not come into contact with the filling gas in the machine and thus also cannot absorb any filling gas.

The advantages of both alternatives can be summarized as follows:
  minimum susceptibility to trouble at the shaft and sealing ring by avoiding the mixed friction (floating ring),
  minimum susceptibility to trouble in the oil supply system by 100% redundancy of the components, minimum surveillance,
  in particular in the case of the inner transfer (second alternative), no appreciable additional expenditure compared with single-circuit seals.

BRIEF DESCRIPTION OF THE DRAWINGS

Exemplary embodiments of the invention are illustrated in simplified representation in the drawings.

FIG. 1 shows a first embodiment of a shaft seal for gas-filled machines with a choke element, constructed as a stemming ring, on the gas side of the seal;

FIG. 2 shows a diagram for illustrating the pressure profile in the sealing gap of the shaft seal according to FIG. 1;

FIG. 5 shows a second embodiment of a shaft seal with internal transfer from the gas side to the air side in the sealing ring;

FIG. 6 shows a section through the shaft seal according to FIG. 5 along its line AA;

FIG. 7 shows a diagram for illustrating the pressure profile in the sealing gap of the shaft seal according to FIG. 5;

DETAILED DESCRIPTION OF THE INVENTION

Figures 3, 4:
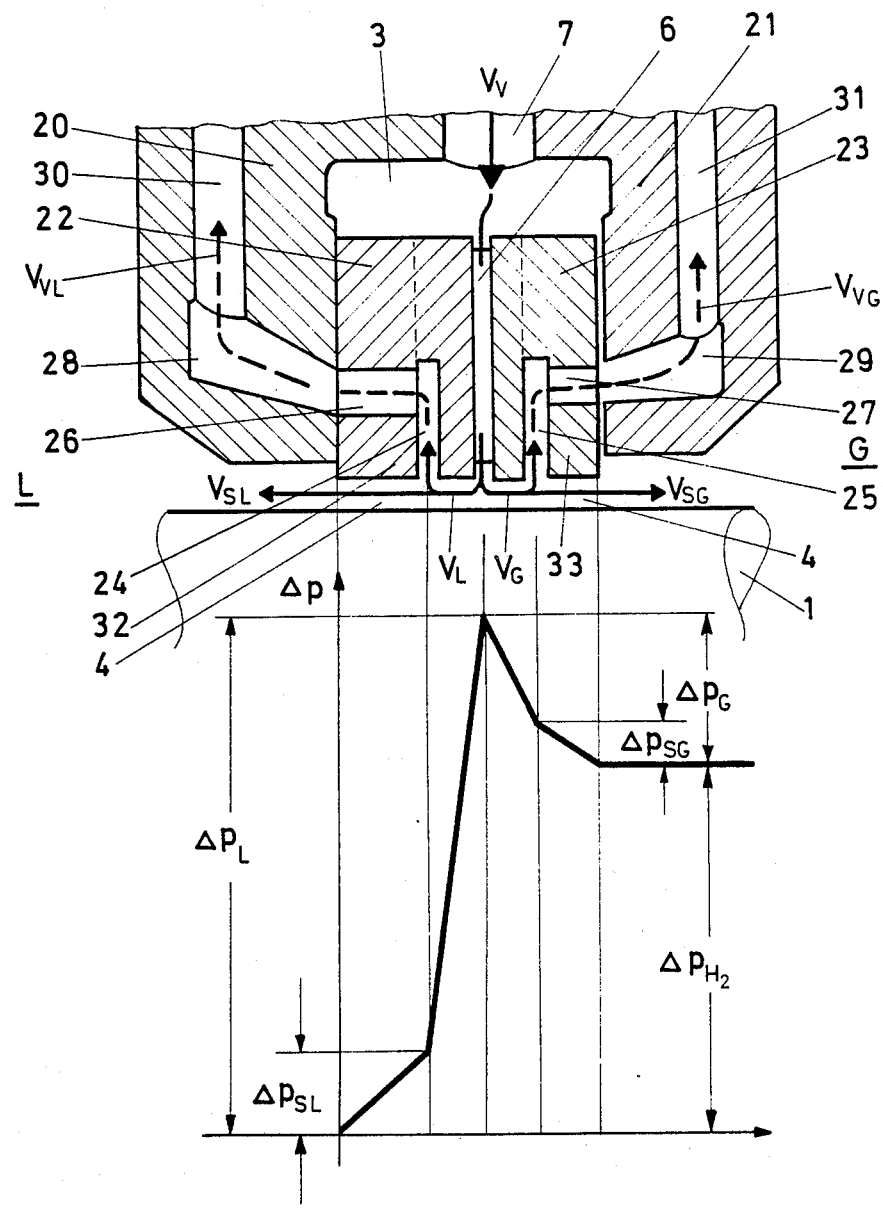
FIG. 3 shows a modification of FIG. 1 with additional choking on the air side.
FIG. 4 shows a diagram for illustrating the pressure profile in the sealing gap of the shaft seal according to FIG. 3.

The shaft seal according to FIG. 1 substantially consists of a seal housing 2, surrounding the shaft 1 on all sides, and a sealing ring 5 which is arranged in the housing interior, the pressure ring chamber 3, and surrounds the shaft 1 while leaving a sealing gap 4. The sealing ring 5 is arranged in a radially movable manner in the pressure ring chamber 3 and has radial through bores or through channels 6 distributed over the entire periphery, of which only one is visible in FIG. 1.

From a confining liquid reservoir (not shown), via a first bore 7 in the sealing ring housing 2, a degassed confining liquid $V_V$ is forced under pressure in the direction of the arrow into the sealing ring chamber.

The confining liquid passes from the space between the outer periphery of the sealing ring 5 and the sealing housing 2 through the bores or through channels 6 in the sealing gap 4 and is distributed there into two volumetric flows $V_L$ and $V_G$ in the direction of the air side L and the gas side G of the shaft seal.

In this respect, the shaft seal just described corresponds to the prior art, as follows, for example, from the applicant's company publication "Generators for large power plants", publication No. CH-T 070 022E, page 26, FIG. 43, with related text on page 27.

Now whereas in the known shaft seal according to the company publication and also according to Swiss Patent Specification No. 385,581, the confining liquid comes out of the seal via a sealing gap, in the shaft seal according to FIG. 1 a second sealing ring, a stemming ring 8, is provided in the seal housing 2, which stemming ring 8 deflects, by stemming, a large portion $V_{VG}$ of the evacuated liquid flow $V_G$ flowing off to the gas side G.

For this purpose, provided between the first sealing ring 5 and the end face of the stemming ring 8 facing this sealing ring are radially running channels 9 which connect the sealing gap 4 to a lateral collecting space 10 in the gas-side half of the seal housing 2. From the collecting space via a second bore 11 in the seal housing 2, the confining-liquid component flow $V_{VG}$ passes directly back into the confining liquid reservoir containing degassed confining liquid; directly because this component flow $V_{VG}$ on its passage through the shaft seal has not come into contact with the filling gas in the machine.

In the exemplary embodiment in FIG. 1, the channels 9 are formed by spacing the rings 5 and 8 by means of projecting lugs 12 on the end face of the stemming ring 8 facing the sealing ring 5, which lugs are supported axially and especially radially by a collar 13 on the gas-side end face of the sealing ring 5.

As an alternative to this, the stemming ring 8 can be constructed in one piece with the sealing ring 5, in which case the channels 9 would then have to be constructed as bores to the side of the through bore 6.

The volumetric flow $V_{SG}$ let through by the stemming ring 8 to the gas side G can be metered in a simple manner by a variable flow resistance, e.g. a choke valve, installed in the return pipeline for $V_{VG}$, as a result of which the leakage flow $V_{SG}$ is kept within desired limits.

In addition to the choking on the gas side G, choking can be effected on the air side L, as a result of which the proportion of the confining liquid flow to be evacuated can again be reduced. The further development of the invention is illustrated by way of example in FIG. 3 and the associated pressure diagram is illustrated by way of example in FIG. 4, the same parts being provided with the same reference numerals in FIG. 1 and FIG. 3.

The seal housing, for "cleaning" reasons, consists of two similar housing halves 20, 21. The sealing ring is likewise subdivided into two ring halves 22, 23. For assembly reasons, both housing halves 20, 21 are subdivided axially in the shaft center into two radial halves each. The two ring halves 22, 23, likewise for assembly reasons, are split axially, but offset by 90° in the peripheral direction, and screwed together. The radial channels 6 are distributed over the entire periphery of the sealing ring and in each case half the channels 6 can lie in either ring half 22, 23. The confining liquid is fed in the direction of the arrow through the bore 7.

The cleaning technique and the assembly technique for the housing and ring in FIG. 1 are the same.

On both sides of the bore 6, radial grooves 24, 25 are in each case made at the inner periphery of the ring halves 22, 23, which radial grooves 24, 25 communicate with axial bores 26, 27 in the ring halves.

The bores 26, 27 are freely connected to collecting spaces 28, 29 in the air-side and gas-side wall respectively of the seal housing. From the collecting spaces 28, 29, via radially running bores 30, 31, the confining liquid passes directly back into the confining liquid reservoir.

The ends 32, 33, facing the shaft 1, of the ring halves 22, 23 between the grooves 24, 25 and the inner wall of the pressure ring chamber 3 have the function of the stemming ring 8 of the embodiment of FIG. 1.

As in that embodiment, the two confining liquid flows $V_L$ and $V_G$ are choked in such a way that a predeterminable proportion $V_{VL}$ and $V_{VG}$ respectively of confining liquid, without coming into contact with air and filling gas respectively, can be fed back through the bores 30 and 31 respectively directly into the confining liquid reservoir and the leakage flows $V_{SL}$ and $V_{SG}$ respectively can accordingly be kept small.

The pressures occurring over the axial length in the sealing gap 4 are illustrated in the diagram according to FIG. 4, the same designations as in FIG. 2 applying in FIG. 4. New in FIG. 4 is the flattened section, caused by the "stemming ring" 32, of the pressure curve on the air side L between the groove 24 and the inner wall of the left-hand housing half 20.

As indicated in FIG. 3 by the radially running broken lines in the ring halves 22, 23, these ring halves 22, 23 can also be split in the area of the grooves 24, 25.

Whereas in the shaft seals described above a considerable portion of the confining liquid, after passing a sealing gap section, is recirculated back into the confining liquid reservoir, and accordingly at least one return line is necessary, in the shaft seal according to FIG. 5 the confining liquid is transferred internally in the center seal section from the gas side to the air side of the seal. The sealing ring consists only of three ring parts, 32, 33 and 34 lying axially one behind the other. The two outer ring parts 32 and 34, on their inner end faces at the end on the sealing gap side, each have an encircling recess 35, 36 which together with the planar ring part 33 form two encircling grooves 37, 38. The center ring part 33, at the end on the sealing gap side, has a plurality of axially running through bores 39 which are regularly distributed over the entire periphery.

As follows from FIG. 6, which shows a section through the center ring part 33 along line AA in FIG. 5, the bores 39 each lie between two radial bores 6 without intersecting them.

The confining liquid (liquid flow VV) is fed via the bore 7 to the sealing ring chamber 3 and passes via the radial bores 6 in the center ring part 33 into the sealing gap 4. Here, it divides up into two liquid flows $V_L$ and $V_G$. A portion $V_{VG}$ of the flow flowing off to the gas side G is transferred via the bores 39 to the air side L and mixes with the flow $V_L$ in the gap between the shaft 1 and the left-hand ring part 32.

The pressure relationships occurring in the sealing gap are illustrated in the diagram according to FIG. 7, the designations corresponding to those in FIGS. 2 and 4 respectively.

The length of the sealing gap $L_{32}$ between ring part 32 and shaft 1 is dimensioned in accordance with the pressure drop $\Delta P_L$ for $V_L+V_{VG}$ remaining in the pressure diagram (FIG. 7). The length of the sealing gap $L_{33}$ between the air-side section of the center ring part 33 and the shaft 1 is dimensioned in accordance with the pressure drop $\Delta P_{max}-\Delta P_L$ for the liquid flow $V_L$. Finally, the bore diameter (of the bores 39) is dimensioned in accordance with the pressure drop $\Delta P_{GL}$ for the volumetric flow $V_{VG}$.

Instead of three ring parts 32, 33 and 34, it is possible to construct the ring parts 32 and 33 or also 33 and 34 in one piece. The end faces of the outer ring parts 32 and 34 facing each other can also be planar, in which case recesses 35 and 36 are then to be provided in the center ring part.

In the exemplary embodiment in FIG. 5 it is also indicated how the shaft seal, by different configuration of the outer end face of the outer ring parts 32 and 34, can be provided with an axial thrust compensation (recess 40 in the section remote from the shaft of the air-side ring part 32, recess 41 in the section close to the shaft of the gas-side ring part 34). A thrust compensation of this type is also provided in the embodiment in FIG. 1.

With regard to the cleaning technique and assembly technique for housing and ring, the same statements apply as were made in connection with FIGS. 1 and 3.

Figure 8:
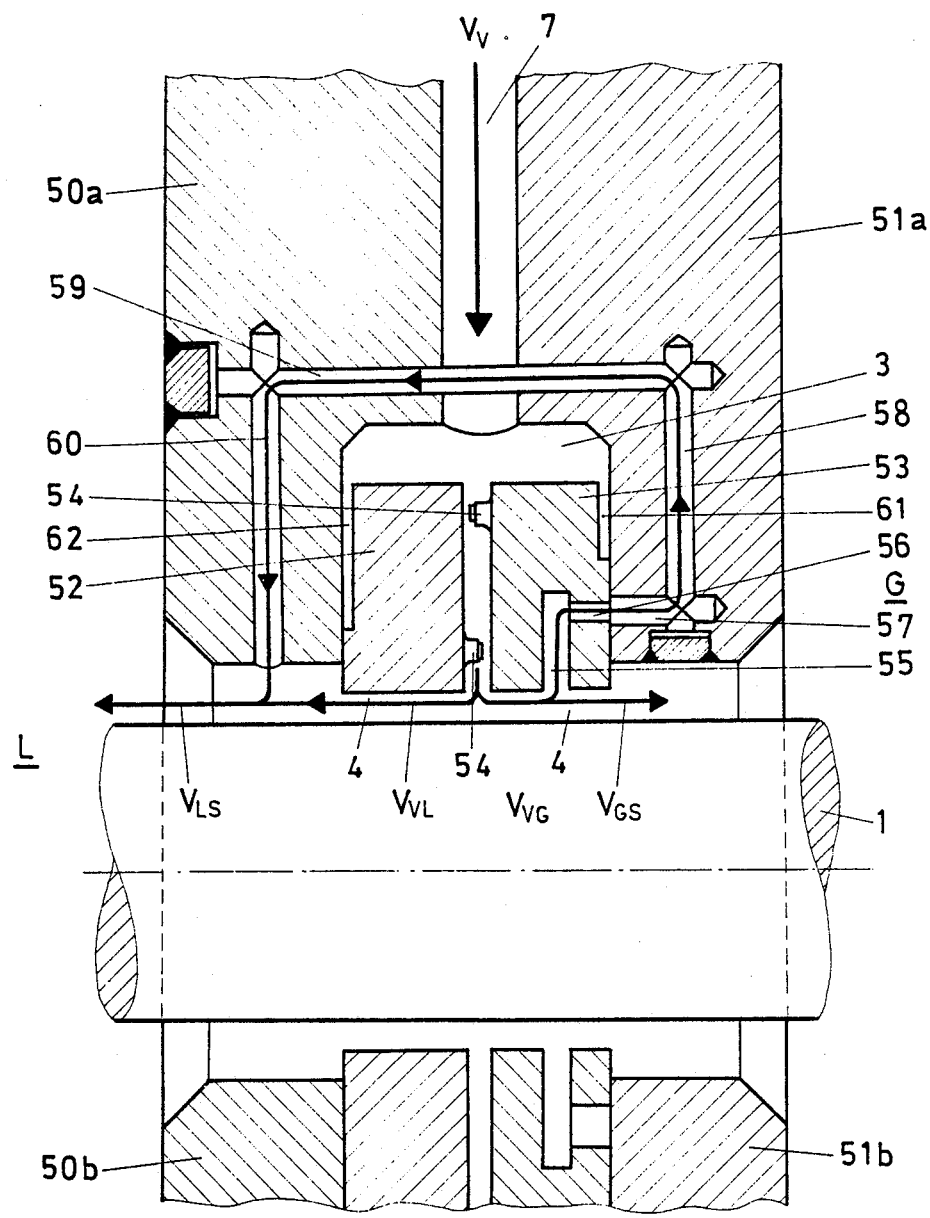
FIG. 8 shows a third embodiment of a shaft seal with internal transfer from the gas side to the air side in the seal housing.

The shaft seal schematically shown in FIG. 8, with regard to its function, substantially corresponds to that according to FIG. 5 but has a transfer section running in the seal housing. For this purpose, the seal housing is made in four parts. It is subdivided into two axial parts 50 and 51 by a radial cut. These two parts are in turn divided by an axial cut into two radial parts 50a, 50b and 51a, 51b, all four parts being detachably connected together by connecting means (not shown). Provided in the housing are one or two oil feed bores 7 which open out into the pressure ring chamber 3. The sealing ring arrangement is two-part and consists of two rings, the air ring 52 and the gas ring 53, which lie axially next to one another (not connected), each of which, for assembly reasons, consists of two ring halves. Provided on the end faces of the rings 52, 53 facing each other are lugs 54 which, when confining liquid is applied, prevent the rings from abutting against one another and prevent the confining liquid from flowing off in the gap between the outer ring end faces and the housing walls. The entire axial clearance of the rings in the pressure ring chamber 3 is typically between 0.2 and 0.4 mm.

In the gas ring 53, approximately in the center section, an encircling groove 55 open toward the sealing gap 4 is provided; it communicates with a plurality of axial bores 56 in the gas ring 53 which open out at the gas-side end face of the gas ring 53. These bores extend into axial blind bores 57 in the gas-side housing wall of the housing parts 51a and 51b. respectively. The blind bores are each connected to an overflow line consisting of a radial blind bore 58, an axial blind bore 59 in the housing parts 50a and 51a, and 50b and 51b respectively, and a further blind bore 60 in the housing parts 50a and 50b respectively, which overflow line runs completely in the seal housing and also does not intersect the oil feed bore(s) 7. The overflow line opens out on the air side L in the gap between seal housing and shaft 1. Welded-in plugs 63 close in a gas-tight manner the bore 58 at the gap-side end and the bore 59 at the air-side end face of the seal housing. Instead of axial blind bores 57 in the housing part 51, an axially running annular groove can also be provided.

On account of the different pressures which act on the sealing rings 52 and 53, these sealing rings 52 and 53 are subjected to an axial thrust. This thrust is smaller at the gas ring 53 than at the air ring 52 on account of the smaller pressure difference. This slight axial thrust can be further reduced by the recess 61 at the outer end face of the gas ring 53. The gas ring 53 is a genuine floating ring despite the close contact with the housing wall.

The air ring 52, on account of the large pressure difference between the confining liquid and the outer space (air side L), receives a large axial thrust, which, however, can be compensated by the recess 62 at the outer end face of the air ring 52 to the extent that even the air ring 52 can function as a floating ring.

The mode of operation of the shaft seal according to FIG. 8 corresponds in principle to that according to FIG. 5, the pressure diagram also having the same fundamental profile.

I claim:

1. A shaft seal for gas-filled machines, in particular hydrogen-cooled turbo-generators, comprising a pressure ring chamber (3) to which degassed confining liquid is fed under positive pressure via a feed line (7), a sealing ring (5; 22, 23) which surrounds the shaft (1) while maintaining a sealing gap (4), has bores (6) or channels which run approximately radially and open out in the sealing gap (4) and is arranged in the pressure ring chamber (3) in a substantially radially movable manner, and means for drawing off the confining liquid which comes laterally out of the sealing gap (4) and for reconducting it to a confining-liquid preparation and pressure-generating plant, wherein, in the pressure ring chamber (3), next to the sealing ring (5; 22), a second, substantially axially movable ring (8; 23) is provided which is arranged between the sealing ring (5; 22) and the gas-side end wall of the pressure ring chamber (3), and wherein, in the second ring (8, 23) or between the first (5; 22) and second ring (8; 23), substantially radially running channels (9; 25) are provided through which a portion of the degassed confining liquid flowing off to the gas side is diverted or fed back from the sealing gap (4).

2. A shaft seal as claimed in claim 1, wherein the second ring (8) is constructed in one piece with the sealing ring (5).

3. A shaft seal as claimed in claim 1, wherein, in the sealing ring (22) and in the second ring (23), radial grooves (24, 25) are provided which communicate with axially running bores (26, 27) in the outer end faces of both rings, which bores in turn are freely connected to collecting spaces (28, 29) in the side walls of the seal housing (20, 21).

4. A shaft seal as claimed in claim 3, wherein the second ring (23) is constructed in one piece with the first ring (22), and the radial bore (6) runs between the two grooves (24, 25) without intersecting them.

5. A shaft seal for gas-filled machines, in particular hydrogen-cooled turbo-generators, having a pressure ring chamber (3) to which degassed confining liquid is fed under positive pressure via a feed line (7), a sealing ring (32, 33, 34) which surrounds the shaft (1) while maintaining a sealing gap (4), has bores (6) or channels which run approximately radially and open out in the sealing gap (4) and is arranged in the pressure ring chamber (3) in a substantially radially movable manner, and means for drawing off the confining liquid which comes laterally out of the sealing gap (4) and reconducting it to a confining-liquid preparation and pressure-generating plant, wherein means (37, 38, 39; 55–60) for transferring a portion of the confining liquid, flowing off to the gas side (G) of the shaft seal, to the air side (L) of the shaft seal are provided in the sealing ring center part (33) and/or in the sealing ring housing (50, 51).

6. A shaft seal as claimed in claim 5, wherein recesses are provided in the sealing-ring center part (33) on both sides of the radial bores (6), which recesses, with the two other ring parts, form encircling grooves (37, 38), and wherein approximately axially running bores (39) are provided in the sealing-ring center part (33) in the area close to the gap, which bores (39) open out into the said annular grooves (37, 38) and do not intersect said radial bores (6).

7. A shaft seal as claimed in claim 6, wherein the sealing ring consists of three ring parts (32, 33, 34), a plurality of radial through bores (6) being provided in the center ring part (33) and a plurality of axially running bores (39) which do not intersect the radial bores (6) being provided in its end close to the shaft, and the recesses forming the annular grooves (37, 38) being provided in each of the ring parts (32, 33).

8. A shaft seal as claimed in claim 7, wherein the center ring part (33) is constructed in one piece with one of two outer ring parts (32; 34).

9. A shaft seal as claimed in claim 5, wherein the sealing ring is subdivided into an air-side (52) and a gas-side sealing ring (53), a groove (55) open toward the sealing gap (4) being made in the gas-side sealing ring (53), which groove (55), via a plurality of axially running bores (56), is in each case connected to an extension (57) in the housing (51) and to a substantially U-shaped overflow line (58, 59, 60) which runs completely in the seal housing (50, 51) and does not intersect the feed line (7) in the housing, which overflow lines open out on the air side (L) in the gap between housing (50) and shaft (1).

* * * * *